(12) United States Patent
Zhang et al.

(10) Patent No.: US 12,334,547 B2
(45) Date of Patent: Jun. 17, 2025

(54) ANODE MATERIAL, ELECTROCHEMICAL DEVICE AND ELECTRONIC DEVICE INCLUDING THE SAME

(71) Applicant: Ningde Amperex Technology Limited, Fujian (CN)

(72) Inventors: Ting Zhang, Fujian (CN); Zhihuan Chen, Fujian (CN); Daoyi Jiang, Fujian (CN); Hang Cui, Fujian (CN)

(73) Assignee: Ningde Amperex Technology Limited, Ningde (JP)

( * ) Notice: Subject to any disclaimer, the term of this patent is extended or adjusted under 35 U.S.C. 154(b) by 561 days.

(21) Appl. No.: 17/690,148

(22) Filed: Mar. 9, 2022

(65) Prior Publication Data

US 2022/0199985 A1 Jun. 23, 2022

Related U.S. Application Data

(63) Continuation of application No. PCT/CN2019/128837, filed on Dec. 26, 2019.

(51) Int. Cl.
*H01M 4/00* (2006.01)
*H01M 4/36* (2006.01)
(Continued)

(52) U.S. Cl.
CPC .......... *H01M 4/366* (2013.01); *H01M 4/386* (2013.01); *H01M 4/623* (2013.01); *H01M 4/625* (2013.01);
(Continued)

(58) Field of Classification Search
CPC .. H01M 4/366; H01M 4/386; H01M 10/0525; H01M 2004/021; H01M 4/623; H01M 4/625
See application file for complete search history.

(56) References Cited

U.S. PATENT DOCUMENTS

2010/0296227 A1 11/2010 Chacko
2014/0242461 A1 8/2014 Hwang et al.
(Continued)

FOREIGN PATENT DOCUMENTS

CN 101315974 A 12/2008
CN 101420021 A 4/2009
(Continued)

OTHER PUBLICATIONS

Office Action issued on Dec. 26, 2022, in corresponding Chinese Application No. 201911368760.7, 20 pages.
(Continued)

*Primary Examiner* — Anca Eoff
*Assistant Examiner* — Monique M Wills
(74) *Attorney, Agent, or Firm* — Maier & Maier, PLLC (57) ABSTRACT

An anode material includes silicon-based particles, the silicon-based particles include a silicon-containing substrate, at least a part of the surface of the silicon-containing substrate has: (i) a polymer layer, and/or (ii) an amorphous carbon layer, and the polymer layer or the amorphous carbon layer includes carbon nanotubes, the silicon-based particles include metal elements, the metal elements include Fe, Cu, Zn, Ni, Co, or any combination thereof; wherein the content of the metal elements selected from Fe, Cu, Zn, Ni, Co, or any combination thereof is less than about 2500 ppm based on the total weight of the silicon-based particles. A lithium ion battery with the anode active material has a reduced impedance and K value, and improved first efficiency and cycle performance.

20 Claims, 3 Drawing Sheets

(51) Int. Cl.
    *H01M 4/38* (2006.01)
    *H01M 4/62* (2006.01)
    *H01M 4/02* (2006.01)

(52) U.S. Cl.
    CPC ............... *H01M 2004/021* (2013.01); *H01M 2004/027* (2013.01)

(56) References Cited

U.S. PATENT DOCUMENTS

| | | | |
|---|---|---|---|
| 2017/0077497 A1 | 3/2017 | Ogata et al. | |
| 2020/0119353 A1* | 4/2020 | Jang | H01M 4/366 |

FOREIGN PATENT DOCUMENTS

| | | | |
|---|---|---|---|
| CN | 101243566 | B | 5/2010 |
| CN | 102569723 | A | 7/2012 |
| CN | 102792498 | A | 11/2012 |
| CN | 104022257 | A | 9/2014 |
| CN | 104885269 | A | 9/2015 |
| CN | 105552339 | A | 5/2016 |
| CN | 106953068 | A | 7/2017 |
| CN | 107293701 | A | 10/2017 |
| CN | 108336345 | A | 7/2018 |
| CN | 109301184 | A | 2/2019 |
| CN | 109841823 | A | 6/2019 |
| CN | 109980199 | A | 7/2019 |
| CN | 110085856 | A | 8/2019 |
| CN | 110571412 | A | 12/2019 |
| JP | 2016152098 | A | 8/2016 |
| JP | 2017076597 | A | 4/2017 |
| JP | 2017536645 | A | 12/2017 |
| JP | 2017536676 | A | 12/2017 |
| WO | 2016136543 | A1 | 9/2016 |

OTHER PUBLICATIONS

Office Action issued on Jun. 15, 2023, in corresponding Chinese Application No. 201911368760.7, 16 pages.
Office Action issued on Sep. 28, 2023, in corresponding Chinese Application No. 201911368760.7, 12 pages.
Office Action issued on Sep. 6, 2022, in corresponding Japanese Application No. 2021-540531, 4 pages.
Office Action issued on Dec. 6, 2022, in corresponding Japanese Application No. 2021-540531, 4 pages.
International Search Report (with Machine Translation) and Written Opinion (with Machine Translation) issued on Sep. 27, 2020 in corresponding International Application No. PCT/CN2019/128837; 14 pages.
Extended European Search Report issued on Jul. 24, 2024, in corresponding European Application No. 19897566.6, 9 pages.
Sun, "The Application of Multi-Walled Carbon Nanotubes as Conductive Additives in Lithium-ion Power Battery", Master's Thesis Fudan University Department of Polymer Science, School Code: 10246, Student ID 10220440013, Apr. 30, 2012, 77 pages (with partial English translation).

* cited by examiner

ANODE MATERIAL, ELECTROCHEMICAL DEVICE AND ELECTRONIC DEVICE INCLUDING THE SAME

CROSS-REFERENCE TO RELATED APPLICATIONS

The present application is a national phase application of PCT application PCT/CN2019/128837, filed on Dec. 26, 2019, the disclosure of which is hereby incorporated by reference in its entirety.

BACKGROUND

1. Technical Field

The present application relates to the field of energy storage, and in particular, to an anode material, and an electrochemical device and an electronic device including the same, particularly a lithium-ion battery.

2. Description of the Related Art

With the popularity of consumer electronics, in products such as notebook computers, mobile phones, tablet computers, mobile power supplies, and unmanned aerial vehicles, the requirements for electrochemical devices therein are becoming stricter. For example, a battery is not only required to be light in weight, but is also required to have high capacity and a relatively long service life. Lithium ion batteries have occupied the mainstream position in the market due to their outstanding advantages such as high energy density, high safety, no memory effect and long service life.

SUMMARY

Embodiments of the present application provide an anode material to solve at least one of the problems existing in the related art at least to some extent. The embodiments of the present application further provide an anode using the anode material, an electrochemical device and an electronic device.

In one embodiment, the present application provides an anode material, the anode material includes silicon-based particles, the silicon-based particles include a silicon-containing substrate, at least a part of the surface of the silicon-containing substrate has:
  (i) a polymer layer, and/or
  (ii) an amorphous carbon layer, and
  the polymer layer or the amorphous carbon layer includes carbon nanotubes,
  the silicon-based particles include metal elements, the metal elements include Fe, Cu, Zn, Ni, Co, or any combination thereof; the content of the metal elements selected from Fe, Cu, Zn, Ni, Co, or any combination thereof is less than about 2500 ppm based on the total weight of the silicon-based particles.

In another embodiment, the present application provides an anode, including the anode material according to the embodiments of the present application.

In another embodiment, the present application provides an electrochemical device, including the anode according to the embodiments of the present application.

In another embodiment, the present application provides an electronic device, including the electrochemical device according to the embodiments of the present application.

A lithium ion battery with an anode active material of the present application has a reduced impedance and K value, and improved first efficiency and cycle performance.

Additional aspects and advantages of the embodiments of the present application will be described or shown in the following description or interpreted by implementing the embodiments of the present application.

BRIEF DESCRIPTION OF THE DRAWINGS

Drawings necessary to describe the embodiments of the present application or the prior art will be briefly illustrated so as to facilitate the description of the embodiments of the present application. Obviously, the accompanying drawings show only some of the embodiments of the present application. For those skilled in the art, the drawings of other embodiments can still be obtained according to the structures illustrated in the drawings without any creative effort.

DETAILED DESCRIPTION

The embodiments of the present application will be described in detail below. The embodiments of the present application should not be interpreted as limitations to the present application.

As used in the present application, the term "about" is used for describing and explaining minor variations. When being used in combination with an event or circumstance, the term may refer to an example in which the event or circumstance occurs precisely, and an example in which the event or circumstance occurs approximately. For example, when being used in combination with a value, the term may refer to a variation range of less than or equal to ±10% of the value, for example, less than or equal to ±5%, less than or equal to ±4%, less than or equal to ±3%, less than or equal to ±2%, less than or equal to ±1%, less than or equal to ±0.5%, less than or equal to ±0.1%, or less than or equal to ±0.05%.

In addition, sometimes, a quantity, a ratio, and another value are presented in a range format in the present application. It should be appreciated that such range formats are for convenience and conciseness, and should be flexibly understood as including not only values explicitly specified to range constraints, but also all individual values or sub-ranges within the ranges, like explicitly specifying each value and each sub-range.

In the detailed description and the claims, a list of items connected by the term "one of" or similar terms may mean any of the listed items. For example, if items A and B are listed, then the phrase "one of A and B" means only A or only B. In another example, if items A, B, and C are listed, then the phrase "one of A, B and C" means only A; only B; or only C. The item A may include a single component or multiple components. The item B may include a single component or multiple components. The item C may include a single component or multiple components.

In the detailed description and the claims, a list of items connected by the term "at least one of" or similar terms may mean any combination of the listed items. For example, if items A and B are listed, then the phrase "at least one of A and B" means only A; only B; or A and B. In another example, if items A, B and C are listed, then the phrase "at least one of A, B and C" means only A; or only B; only C; A and B (excluding C); A and C (excluding B); B and C (excluding A); or all of A, B and C. The item A may include a single component or multiple components. The item B may include a single component or multiple components. The item C may include a single component or multiple components.

I. Anode Material

In some embodiments, the present application provides an anode material, wherein the anode material includes silicon-based particles, the silicon-based particles include a silicon-containing substrate, at least a part of the surface of the silicon-containing substrate has:

(i) a polymer layer, and/or (ii) an amorphous carbon layer, and the polymer layer or the amorphous carbon layer includes carbon nanotubes, the silicon-based particles include metal elements, the metal elements include Fe, Cu, Zn, Ni, Co, or any combination thereof, the content of the metal elements selected from Fe, Cu, Zn, Ni, Co, or any combination thereof is less than about 2500 ppm based on the total weight of the silicon-based particles. In some other embodiments, the entire surface of the silicon-containing substrate has: (i) a polymer layer, and/or (ii) an amorphous carbon layer.

In some embodiments, the content of the metal elements selected from Fe, Cu, Zn, Ni, Co, or any combination thereof is less than about 2200 ppm based on the total weight of the silicon-based particles. In some embodiments, based on the total weight of the silicon-based particles, the content of the metal elements selected from Fe, Cu, Zn, Ni, Co, or any combination thereof is about 2000 ppm, about 1800 ppm, about 1500 ppm, about 1200 ppm, about 1000 ppm, about 800 ppm, about 500 ppm, about 200 ppm, about 100 ppm, or a range consisting of any two of these numerical values.

In some embodiments, the average particle size of the silicon-based particles is about 500 nm to 30 μm. In some embodiments, the average particle size of the silicon-based particles is about 1 μm to 25 μm. In some embodiments, the average particle size of the silicon-based particles is about 5 μm, about 10 μm, about 15 μm, about 20 μm, or a range consisting of any two of these numerical values.

In some embodiments, the silicon-containing substrate includes $SiO_x$, and $0.6 \leq x \leq 1.5$.

In some embodiments, the silicon-containing substrate includes Si, SiO, $SiO_2$, SiC, or any combination thereof.

In some embodiments, the Si has a particle size less than about 100 nm. In some embodiments, the Si has a particle size less than about 50 nm. In some embodiments, the Si has a particle size less than about 20 nm. In some embodiments, the Si has a particle size less than about 5 nm. In some embodiments, the Si has a particle size less than about 2 nm. In some embodiments, the particle size of the Si is less than about 0.5 nm. In some embodiments, the particle size of the Si is about 10 nm, about 20 nm, about 30 nm, about 40 nm, about 50 nm, about 60 nm, about 70 nm, about 80 nm, about 90 nm, or a range consisting of any two of these numerical values.

In some embodiments, the polymer layer includes the following polymers: carboxymethyl cellulose, polyacrylic acid, polyacrylonitrile, polyvinyl alcohol, polyvinylpyrrolidone, polyaniline, polyimide, polyamideimide, polysiloxane, polystyrene-butadiene rubber, epoxy resin, polyester resin, polyurethane resin, polyfluorene, or any combination thereof.

In some embodiments, amorphous carbon in the amorphous carbon layer is obtained by sintering the following polymers: carboxymethyl cellulose, polyacrylic acid, polyacrylonitrile, polyvinyl alcohol, polyvinylpyrrolidone, polyaniline, polyimide, polyamideimide, polysiloxane, polystyrene-butadiene rubber, epoxy resin, polyester resin, polyurethane resin, polyfluorene, or any combination thereof.

In some embodiments, the content of the polymer layer or the amorphous carbon layer is about 0.05 to 15 wt % based on the total weight of the silicon-based particles. In some embodiments, the content of the polymer layer or the amorphous carbon layer is about 1 to 10 wt % based on the total weight of the silicon-based particles. In some embodiments, based on the total weight of the silicon-based particles, the content of the polymer layer or the amorphous carbon layer is about 2 wt %, about 3 wt %, about 4 wt %, about 5 wt %, about 6 wt %, about 7 wt %, about 8 wt %, about 9 wt %, about 10 wt %, about 11 wt %, about 12 wt %, about 13 wt %, about 14 wt %, about 14 wt %, or a range consisting of any two of these numerical values.

In some embodiments, the thickness of the polymer layer or the amorphous carbon layer is about 2 nm to 200 nm. In some embodiments, the thickness of the polymer layer or the amorphous carbon layer is about 10 nm to 150 nm. In some embodiments, the thickness of the polymer layer or the amorphous carbon layer is about 50 nm to 100 nm. In some embodiments, the thickness of the polymer layer or the amorphous carbon layer is about 5 nm, about 10 nm, about 20 nm, about 30 nm, about 40 nm, about 50 nm, about 60 nm, about 70 nm, about 80 nm, about 90 nm, about 100 nm, about 110 nm, about 120 nm, about 130 nm, about 140 nm, about 150 nm, about 160 nm, about 170 nm, about 180 nm, about 190 nm, about 200 nm, or a range consisting of any two of these numerical values.

In some embodiments, the carbon nanotubes include single-wall carbon nanotubes, multi-wall carbon nanotubes, or a combination thereof.

In some embodiments, the diameter of the carbon nanotube is about 1 to 30 nm. In some embodiments, the diameter of the carbon nanotube is about 5 to 20 nm. In some embodiments, the diameter of the carbon nanotube is about 10 nm, about 15 nm, about 20 nm, about 25 nm, about 30 nm, or a range consisting of any two of these numerical values.

In some embodiments, a length-diameter ratio of the carbon nanotubes is about 50 to 30000. In some embodiments, a length-diameter ratio of the carbon nanotubes is about 100 to 20000. In some embodiments, a length-diameter ratio of the carbon nanotubes is about 500, about 2000, about 5000, about 10000, about 15000, about 2000, about 25000, about 30000, or a range consisting of any two of these numerical values.

In some embodiments, the content of the carbon nanotubes is about 0.01 to 10 wt % based on the total weight of the silicon-based particles. In some embodiments, the content of the carbon nanotubes is about 1 to 8 wt % based on the total weight of the silicon-based particles. In some embodiments, based on the total weight of the silicon-based particles, the content of the carbon nanotubes is about 0.02 wt %, about 0.05 wt %, about 0.1 wt %, about 0.5 wt %, about 1 wt %, about 1.5 wt %, about 2 wt %, about 2 wt %, about 3 wt %, about 4 wt %, about 5 wt %, about 6 wt %, about 7 wt %, about 8 wt %, about 9 wt %, about 10 wt %, or a range consisting of any two of these numerical values.

In some embodiments, a weight ratio of the polymer in the polymer layer or the amorphous carbon in the amorphous carbon layer to the carbon nanotubes is about 1:5-10:1. In some embodiments, a weight ratio of the polymer in the polymer layer or the amorphous carbon in the amorphous carbon layer to the carbon nanotubes is about 1:5, about 1:3, about 1:1, about 3:1, about 5:1, about 7:1, about 8:1, about 10:1, or a range consisting of any two of these numerical values.

In some embodiments, the specific surface area of the silicon-based particles is about 2.5 to 15 m$^2$/g. In some embodiments, the specific surface area of the silicon-based particles is about 5 to 10 m$^2$/g. In some embodiments, the specific surface area of the silicon-based particles is about 3 m$^2$/g, about 4 m$^2$/g, about 6 m$^2$/g, about 8 m$^2$/g, about 10 m$^2$/g, about 12 m$^2$/g, about 14 m$^2$/g, or a range consisting of any two of these numerical values.

In some embodiments, any of the above anode materials further include graphite particles. In some embodiments, a weight ratio of the graphite particles to the silicon-based particles is about 3:1-20:1. In some embodiments, a weight ratio of the graphite particles to the silicon-based particles is about 3:1, about 5:1, about 6:1, about 7:1, about 10:1, about 12:1, about 15:1, about 18:1, about 20:1, or a range consisting of any two of these numerical values.

II. Preparation Method of the Anode Material

The embodiments of the present application provide a method for preparing any of the above anode materials, the method includes the following steps:
(1) adding carbon nanotube powder to a solution containing a polymer, and dispersing for about 1 to 24 hr to obtain a slurry;
(2) adding a silicon-containing substrate to the slurry, and dispersing for about 2 to 4 hr to obtain a mixed slurry;
(3) removing the solvent from the mixed slurry; and
(4) crushing and screening to obtain the silicon-based particles.

In some embodiments, the method further includes a step of mixing the above silicon-based particles with graphite particles. In some embodiments, a weight ratio of the graphite particles to the silicon-based particles is about 3:1, about 5:1, about 6:1, about 7:1, about 10:1, about 12:1, about 15:1, about 18:1, about 20:1, or a range consisting of any two of these numerical values.

In some embodiments, the definitions of the silicon-containing substrate, carbon nanotubes, and the polymer are as described above.

In some embodiments, a weight ratio of the polymer to the carbon nanotube powder is about 1:10-10:1. In some embodiments, a weight ratio of the polymer to the carbon nanotube powder is about 1:8, about 1:5, about 1:3, about 1:1, about 3:1, about 5:1, about 7:1, about 10:1, or a range consisting of any two of these numerical values.

In some embodiments, a weight ratio of the silicon-containing substrate to the polymer is about 200:1-5:1. In some embodiments, a weight ratio of the silicon-containing substrate to the polymer is about 150:1-5:1. In some embodiments, a weight ratio of silicon-containing substrate to the polymer is about 200:1, about 150:1, about 100:1, about 50:1, about 10:1, about 1:1, about 5:1, or a range consisting of any two of these numerical values.

In some embodiments, the solvent includes water, ethanol, methanol, n-hexane, N, N-dimethylformamide, pyrrolidone, acetone, toluene, isopropanol, or any combination thereof.

In some embodiments, the dispersion time in step (1) is about 1 hr, about 5 hr, about 10 hr, about 15 hr, about 20 hr, about 24 hr, or a range consisting of any two of these numerical values.

In some embodiments, the dispersion time in step (2) is about 2 hr, about 2.5 hr, about 3 hr, about 3.5 hr, about 4 hr, or a range consisting of any two of these numerical values.

In some embodiments, the method of removing the solvent in step (3) includes rotary evaporation, spray drying, filtration, freeze drying, or any combination thereof.

In some embodiments, a sintering step is further included between step (3) and step (4).

In some embodiments, the sintering temperature is about 250 to 900° C. In some embodiments, the sintering temperature is about 300 to 850° C. In some embodiments, the sintering temperature is about 350 to 650° C. In some embodiments, the sintering temperature is about 400° C., about 500° C., about 600° C., or about 700° C., or a range consisting of any two of these numerical values.

In some embodiments, the sintering time is about 1 to 25 hr. In some embodiments, the sintering time is about 1 to 19 hr. In some embodiments, the sintering time is about 1 to 14 hr. In some embodiments, the sintering time is about 1 hr, about 1.5 hr, about 2 hr, about 2.5 hr, about 3 hr, about 5 hr, about 8 hr, about 10 hr, about 15 hr, about 20 hr, or a range consisting of any two of these numerical values.

In some embodiments, sintering is performed under the protection of inert gas. In some embodiments, the inert gas includes nitrogen, argon, or a combination thereof.

In some embodiments, the screening in step (4) is 400-mesh screening.

Figure 1:
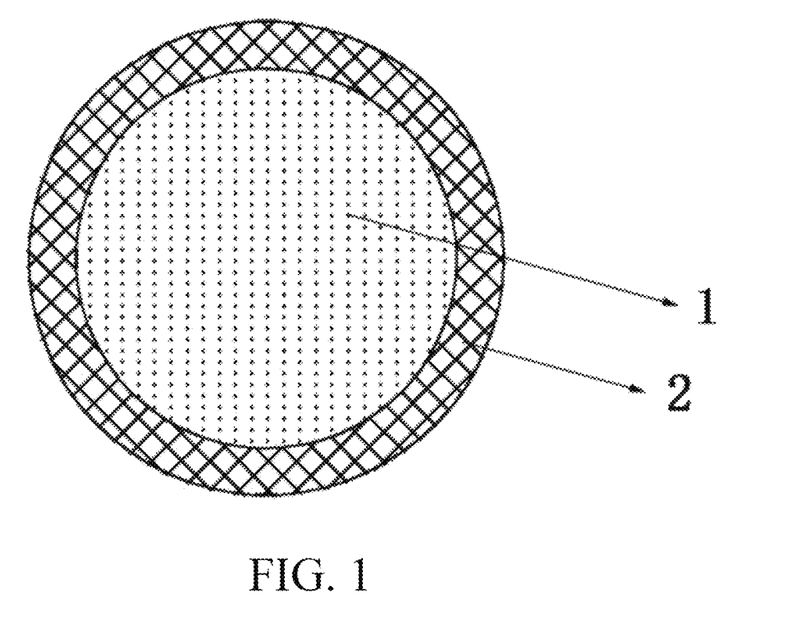
FIG. 1 illustrates a schematic structural diagram of a silicon-based anode active material according to one embodiment of the present application.

FIG. 1 illustrates a schematic structural diagram of a silicon-based anode active material according to one embodiment of the present application. An inner layer 1 is a silicon-containing substrate, and an outer layer 2 is a polymer layer including carbon nanotubes (CNTs). The polymer layer containing the CNTs is distributed on the surface of the silicon-containing substrate, so that the CNTs are restrained to the surface of the silicon-based anode active material by the polymer, which is beneficial for improving interfacial stability of the CNTs on the surface of the anode active material, thereby improving cycle performance.

The silicon-based anode material has a high gram capacity of 1500 to 4200 mAh/g, and is a next-generation lithium ion battery anode material which has the most promising applications. However, about 300% of volume expansion of the silicon during charging and discharging, and an unstable solid electrolyte interfacial (SEI) film formed on its surface greatly affect the performance of the battery. Currently, a method for improving cycle stability and rate performance of a silicon-based material includes: designing a porous silicon-based material, reducing the size of a silicon-oxygen material, and taking measures, such as coating a polymer, coating an oxide, and coating carbon. A commonly used coating includes carbon coating. However, a carbon coating layer is prone to crack during the cycle process, thereby resulting in a sharp decrease in conductivity and poor cycling performance. The polymer coating may form a good bond with the surface of the silicon material, but the conductivity is usually poor, so the impedance is large. CNTs have high mechanical properties and excellent conductivity, thus they may be used as coating materials on the surface of the silicon material. However, the highly conductive CNTs have a low binding force on the surface of the silicon material and are difficult to disperse, and thus difficult to form a uniform coating layer on the surface of the silicon material.

In order to solve the above problems, the present application firstly prepares the silicon-based particles having a polymer layer or an amorphous carbon layer on at least a part of the surface of the silicon-containing substrate, and the polymer layer or the amorphous carbon layer includes the CNTs. The presence of the CNTs improves the conductivity of the anode active material. In addition, the polymer layer or amorphous carbon layer containing the CNTs coats the surface of the silicon-based anode active material. The CNTs may be restrained to the surface of the anode active material by the polymer or amorphous carbon, which is beneficial for enhancing the interfacial stability of the CNTs on the surface of the anode active material and inhibiting volume expansion of the silicon-based material, thereby improving cycle stability.

On the other hand, the inventor of the present application unexpectedly discovered: since the preparation of the CNTs usually uses a metal catalyst, such as nickel-based (Ni), cobalt-based (Co), iron-based (Fe), vanadium-based (V), magnesium-based (Mg), copper-based (Cu), zinc-based (Zn) compounds, and these metal elements usually have residues on the prepared CNTs, it is inevitable to introduce them into the silicon-based anode active material with the composite layer of CNTs and the polymer or amorphous carbon. In addition, during the preparation of the silicon substrate, metal elements are also introduced due to procedures such as crushing and classification. The reduction potential of these metal elements is lower than that of lithium ions. While charging, they will preferentially enter into an anode to occupy the intercalation position of the lithium ion, which will reduce the reversible capacity of the battery. Taking an iron (Fe) element as an example, when Fe deposit in the anode gradually accumulates, its metal dendrites will pierce a separator, thereby causing a micro short circuit causing self-discharge of the battery.

The inventor of the present application found that when the content of a metal element selected from Fe, Cu, Zn, Ni, Co, or any combination thereof in the silicon-based anode active material is less than about 2500 ppm, the K value and impedance of the lithium ion battery prepared therefrom is significantly lower than those of a lithium ion battery with the content of the above metal elements being greater than about 2500 ppm, and the first efficiency and cycle performance are significantly better than those of the lithium ion battery with the content of the above metal elements being greater than about 2500 ppm.

III. Anode

The embodiments of the present application provide an anode. The anode includes a current collector and an anode active material layer located on the current collector. The anode active material layer includes an anode material according to the embodiments of the present application.

In some embodiments, the anode active material layer includes a binder. In some embodiments, the binder includes, but is not limited to, polyvinyl alcohol, carboxymethyl cellulose, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, acrylic styrene-butadiene rubber, epoxy resin, or nylon.

In some embodiments, the anode active material layer includes a conductive material. In some embodiments, the conductive material includes, but is not limited to, natural graphite, artificial graphite, carbon black, acetylene black, Ketjen black, carbon fibers, metal powder, metal fibers, copper, nickel, aluminum, silver, or polyphenylene derivatives.

In some embodiments, the current collector includes, but is not limited to, a copper foil, a nickel foil, a stainless steel foil, a titanium foil, nickel foam, copper foam, or a polymer substrate coated with a conductive metal.

In some embodiments, the anode may be obtained by the following method: Mixing an active material, a conductive material, and a binder in a solvent to prepare an active material composition, and coating the current collector with the active material composition.

In some embodiments, the solvent may include, but is not limited to, deionized water, and N-methylpyrrolidone.

IV. Cathode

A material capable of being applied to a cathode in the embodiment of the present application, a composition and a preparation method thereof include any technology disclosed in prior art. In some embodiments, the cathode is a cathode disclosed in U.S. Pat. No. 9,812,739B, which is incorporated into the present application by full text reference.

In some embodiments, the cathode includes a current collector and a cathode active material layer on the current collector.

In some embodiments, the cathode active material includes, but is not limited to, lithium cobalt oxide (LiCoO$_2$), lithium nickel cobalt manganese (NCM) ternary material, lithium iron phosphate (LiFePO$_4$), or lithium manganese oxide (LiMn$_2$O$_4$).

In some embodiments, the cathode active material layer further includes a binder, and optionally includes a conductive material. The binder improves the binding of the cathode active material particles to each other, and also improves the binding of the cathode active material to the current collector.

In some embodiments, the binder includes, but is not limited to, polyvinyl alcohol, hydroxypropyl cellulose, diacetyl cellulose, polyvinyl chloride, carboxylated polyvinyl chloride, polyvinyl fluoride, a polymer containing ethylene oxide, polyvinylpyrrolidone, polyurethane, polytetrafluoroethylene, poly(1,1-difluoroethylene), polyethylene, polypropylene, styrene-butadiene rubber, acrylated styrene-butadiene rubber, epoxy resin, or nylon, and the like.

In some embodiments, the conductive material includes, but is not limited to, a carbon-based material, a metal-based material, a conductive polymer, and a mixture thereof. In some embodiments, the carbon-based material is selected from natural graphite, artificial graphite, carbon black, acetylene black, Ketjen black, carbon fibers, or any combination thereof. In some embodiments, the metal-based material is selected from metal powder, metal fibers, copper, nickel, aluminum, or silver. In some embodiments, the conductive polymer is a polyphenylene derivative.

In some embodiments, the current collector may include, but is not limited to, aluminum.

The cathode may be prepared by a preparation method known in the art. For example, the cathode may be obtained by the following method: Mixing an active material, a conductive material, and a binder in a solvent to prepare an active material composition, and coating the current collector with the active material composition. In some embodiments, the solvent may include, but is not limited to, N-methylpyrrolidone.

V. Electrolytic Solution

An electrolytic solution that can be used in the embodiments of the present application may be an electrolytic solution known in prior art.

In some embodiments, the electrolytic solution includes an organic solvent, lithium salt, and an additive. The organic solvent of the electrolytic solution according to the present application may be any organic solvent known in the art and capable of serving as a solvent of the electrolytic solution. Electrolytes used in the electrolytic solution according to the present application are not limited, and may be any electrolyte known in the art. The additive of the electrolytic solution according to the present application may be any additive known in the art and capable of serving as an additive of the electrolytic solution.

In some embodiments, the organic solvent includes, but is not limited to, ethylene carbonate (EC), propylene carbonate (PC), diethyl carbonate (DEC), ethyl methyl carbonate (EMC), dimethyl carbonate (DMC), propylene carbonate or ethyl propionate.

In some embodiments, the lithium salt includes at least one of organic lithium salt or inorganic lithium salt.

In some embodiments, the lithium salt includes, but is not limited to, lithium hexafluorophosphate ($LiPF_6$), lithium tetrafluoroborate ($LiBF_4$), lithium difluorophosphate ($LiPO_2F_2$), lithium bis(trifluoromethanesulfonyl)imide $LiN(CF_3SO_2)_2$ (LiTFSI), lithium bis(fluorosulfonyl) imide $Li(N(SO_2F)_2)$ (LiFSI), lithium bis(oxalato)borate $LiB(C_2O_4)_2$ (LiBOB) or lithium difluoro(oxalato)borate $LiBF_2(C_2O_4)$ (LiDFOB).

In some embodiments, the concentration of the lithium salt in the electrolytic solution is: about 0.5 to 3 mol/L, about 0.5 to 2 mol/L, or about 0.8 to 1.5 mol/L.

VI. Separator

In some embodiments, a separator is disposed between the cathode and the anode to prevent a short circuit. The material and shape of the separator that can be used in the embodiments of the present application are not particularly limited, and may be any technology disclosed in prior art. In some embodiments, the separator includes a polymer or an inorganic substance formed by a material stable in the electrolytic solution of the present application.

For example, the separator may include a substrate layer and a surface treatment layer. The substrate layer is a non-woven fabric, a film or a composite film having a porous structure. The material of the substrate layer is selected from at least one of polyethylene, polypropylene, polyethylene terephthalate and polyimide. Specifically, a porous polypropylene film, a porous polyethylene film, a polypropylene non-woven fabric, a polyethylene non-woven fabric, or a porous polypropylene-polyethylene-polypropylene composite film may be used.

The surface treatment layer is disposed on at least one surface of the substrate layer. The surface treatment layer may be a polymer layer or an inorganic substance layer, or a layer formed by mixing the polymer and the inorganic substance.

The inorganic substance layer includes inorganic particles and a binder. The inorganic particles are one or a combination of several selected from the group consisting of aluminum oxide, silicon oxide, magnesium oxide, titanium oxide, hafnium dioxide, tin oxide, cerium oxide, nickel oxide, zinc oxide, calcium oxide, zirconium oxide, yttrium oxide, silicon carbide, boehmite, aluminum hydroxide, magnesium hydroxide, calcium hydroxide, and barium sulfate. The binder is one or a combination of several selected from the group consisting of polyvinylidene fluoride, a vinylidene fluoride-hexafluoropropylene copolymer, polyamide, polyacrylonitrile, polyacrylic ester, polyacrylic acid, polyacrylate, polyvinylpyrrolidone, polyvinyl ether, polymethyl methacrylate, polytetrafluoroethylene and polyhexafluoropropylene.

The polymer layer includes a polymer, and the material of the polymer is selected from at least one of polyamide, polyacrylonitrile, an acrylate polymer, polyacrylic acid, polyacrylate, polyvinylpyrrolidone, polyvinyl ether, polyvinylidene fluoride or poly(vinylidene fluoride-hexafluoropropylene).

VII. Electrochemical Device

The embodiments of the present application provide an electrochemical device including any device that undergoes an electrochemical reaction.

In some embodiments, the electrochemical device of the present application includes a cathode having a cathode active material capable of occluding and releasing metal ions; an anode according to the embodiments of the present application; an electrolytic solution; and a separator disposed between the cathode and the anode.

In some embodiments, the electrochemical device of the present application includes, but is not limited to, all types of primary batteries, secondary batteries, fuel cells, solar cells, or capacitors.

In some embodiments, the electrochemical device is a lithium secondary battery.

In some embodiments, the lithium secondary battery includes, but is not limited to, a lithium metal secondary battery, a lithium ion secondary battery, a lithium polymer secondary battery, or a lithium ion polymer secondary battery.

VIII. Electronic Device

The electronic device of the present application may be any device using the electrochemical device according to the embodiments of the present application.

In some embodiments, the electronic device includes, but is not limited to, a notebook computer, a pen input computer, a mobile computer, an e-book player, a portable phone, a portable fax machine, a portable copy machine, a portable printer, a stereo headphone, a video recorder, a liquid crystal display television, a portable cleaner, a portable CD player, a minidisc player, a transceiver, an electronic notebook, a calculator, a memory card, a portable recorder, a radio, a backup power supply, a motor, a car, a motorcycle, a power-assisted bicycle, a bicycle, a lighting fixture, a toy, a game console, a clock, an electric tool, a flash lamp, a camera, a large household storage battery, or a lithium ion capacitor, and the like.

The lithium ion battery is taken as an example and the preparation of the lithium-ion battery is described in conjunction with specific embodiments. Those skilled in the art would understand that the preparation method described in the present application is only an example, and any other suitable preparation methods are within the scope of the present application.

Embodiment

The following describes embodiments of the lithium-ion battery according to the present application and comparative examples for performance evaluation.

I. Test Method

Powder Property Test Method

1. Specific surface area test: At a constant low temperature, after the adsorption amounts of gas on a solid surface at different relative pressures were measured, the adsorption amount of a monomolecular layer of a test sample was obtained based on the Brunauer-Emmett-Teller adsorption theory and its formula (BET formula), thereby calculating the specific surface area of the solid.

1.5 to 3.5 g of a powder sample was loaded into a test sample tube of a TriStar II 3020, and then was degassed at 200° C. for 120 min and then tested.

3. Powder electronic conductivity test: A four-wire two-terminal method was used to determine the resistance by measuring voltages at both ends of a resistor to be measured and a current flowing through the resistor, and the conductivity was calculated in combination with the height and the bottom area of the resistor to be measured. A certain amount of powder was added to a test mold, and was lightly shaken to be flat, and then a gasket on the mold was placed on the sample. After the sample was loaded, the mold was disposed on a working surface of an electronic pressure testing machine, and was boosted at a rate of 5 mm/min to 500 kg (159 Mpa) and maintained at a constant pressure for 60 s, and the pressure was then released to 0. The sample pressure was recorded when the sample was maintained at the constant pressure to 5000±2 kg (15 to 25 s after the pressure was boosted to 5000 kg), and a deformation height of the sample was read. The numerical value displayed on a resistance tester at this moment was recorded, and the electronic conductivity may be calculated by using a formula.

4. Determination method of the content of metal elements:

Powder: 0.2 g of a silicon-based anode active material in each embodiment and comparative example was weighed, and was placed in a polytetrafluoroethylene (PTFE) beaker, and the weight of the sample was recorded after a measured value on a digital balance was stable, and was accurate to 0.0001 g. 10 mL of concentrated $HNO_3$ and 2 mL of HF were slowly added to the sample, and the sample was placed on a plate heater at 220° C. and was heated and digested until it was almost evaporated to dryness. 10 mL of nitric acid was slowly added and was continuously heated and digested for 15 min, so that the sample was fully dissolved. The dissolved sample was placed in a fume cupboard and cooled to room temperature. A sample solution was shaken well and slowly poured into a funnel with a single layer of filter paper, and the beaker and filter residue were rinsed 3 times. The solution was adjusted to a volume of 50 mL at 20±5° C. and shaken well. An inductively coupled plasma emission spectrometer (PE 7000) was used to test the ion spectral intensity of the filtrate, and the ion concentration of the filtrate was calculated according to a standard curve, thereby calculating the content of the elements in the sample.

Anode: After active materials on the surface of an anode obtained in each embodiment and comparative example were scrapped, thermal treatment was performed at 600° C. for 2 hr, and then the above thermally treated active materials were weighed, and the content of the metal elements was measured by the same test method as that of the powder sample.

5. Scanning electron microscope (SEM) test: SEM characterization was recorded by a PhilipsXL-30 type field emission SEM and tested under the conditions of 10 kV and 10 mA.

6. Transmission electron microscope (TEM) test: A Jeol JEM2100F was used for test characterization.

7. Test method of an energy dispersive spectroscopy (EDS)/Mapping: The EDS test and Mapping were characterized by an OXFORD-EDS, and the voltage was 20 kV.

Button Battery Performance Test

Under a dry argon environment, $LiPF_6$ was added to a solvent formed by mixing propylene carbonate (PC), ethylene carbonate (EC), diethyl carbonate (DEC) (a weight ratio was 1:1:1), and was mixed uniformly. The concentration of $LiPF_6$ was 1.15 mol/L. Then about 7.5 wt % of fluoroethylene carbonate (FEC) was added and mixed uniformly to obtain the electrolytic solution.

The silicon-based anode active material obtained in the embodiments and comparative examples, conductive acetylene black and binder modified polyacrylic acid (PAA), were added to deionized water at a weight ratio of 80:10:10, and were stirred to form a slurry. A scraper was used for coating to form a coating layer with a thickness of 100 μm. The coating layer was dried in a vacuum oven at 85° C. for 12 hr. In a dry environment, the dried coating layer was cut into a wafer with a diameter of 1 cm with a punching machine. A lithium metal sheet was used as a counter electrode in a glove box. A Celgard composite film was selected as the separator and an electrolytic solution was added to assemble a button battery. A LAND series battery test was used to perform charge and discharge tests on the battery. After standing for 3 hr, the battery was discharged to 0.005 V at 0.05 C, and then discharged to 0.005 V at 50 μA. After standing for 5 min, the battery was charged to 2 V at a constant current of 0.1 C. After standing for 5 min, the above steps were repeated twice. The test was performed to obtain charge and discharge capacity curves. A first efficiency calculation method was the capacity when a lithium intercalation voltage was cut off to 0.8 V/the capacity when a lithium removal voltage was cut off to 0.005 V.

Whole-Battery Performance Test

1. High temperature cycle performance test: The test temperature was 45° C. The battery was charged to 4.4 V at a constant current of 0.7 C, and then was charged to 0.025 C at a constant voltage. After standing for 5 min, the battery was discharged to 3.0 V at 0.5 C. The capacity obtained in this step was taken as an initial capacity. A 0.7 C charge/0.5 C discharge cycle test was performed, and the ratio of the capacity of each step to the initial capacity was taken to obtain a capacity attenuation curve (which takes the number of cycles as an X axis and takes a capacity retention ratio as a Y axis). The number of cycles was recorded when the capacity retention ratio was 80%, thereby comparing the high temperature cycle performance of the battery.

2. A discharge rate test: At 25° C., the battery was discharged to 3.0 V at 0.2 C, allowed to stand for 5 min, then charged to 4.4 V at 0.5 C, charged to 0.05 C at a constant voltage, and then allowed to stand for 5 min. The discharge rate was adjusted to perform the discharge test at 0.2 C, 0.5 C, 1 C, 1.5 C, and 2.0 C respectively to obtain respective discharge capacities. Ratios of the capacity obtained under each rate to that obtained under 0.2 C were obtained. The rate performance was compared by comparing the ratios.

3. Direct current resistance (DCR) test: Actual capacity of the battery was tested at 25° C. by using a Maccor machine (the battery was charged to 4.4 V at a constant current of 0.7 C and charged to 0.025 C at a constant voltage, allowed to stand for 10 min, discharged to 3.0 V at 0.1 C, and allowed to stand for 5 min). The battery was discharged to a certain state of charge (SOC) at 0.1

C, and tested for 1 s and discharged. Points were taken in 5 ms, and DCR values under different SOCs were calculated.

4. K value test: After the capacity of the battery was tested, the battery was allowed to stand for 48 hr at room temperature, and its voltage was measured to be V1. Then, the battery was allowed to stand for 48 hr again and its voltage was measured to be V2. The K value was calculated according to the following formula: K=(V1−V2)/48 (unit: mV/hr).

II. Preparation of the Lithium Ion Battery

Preparation of the Cathode

LiCoO$_2$, conductive carbon black and polyvinylidene difluoride (PVDF) were stirred and mixed uniformly in an N-methylpyrrolidone solvent system at a weight ratio of 96.7%:1.7%:1.6% to prepare a cathode slurry. A cathode current collector aluminum foil was coated with the prepared cathode slurry, and then was dried, and cold-pressed to obtain the cathode.

Preparation of the Anode

Graphite and the silicon-based anode active material in the embodiments were mixed at a weight ratio of 89:11 to obtain a mixed anode active material with a gram capacity of 500 mAh/g. The mixed anode active material, conductive agent acetylene black, and PAA were stirred fully in deionized water at a weight ratio of 95:1.2:3.8, mixed uniformly, coated on a Cu foil, dried and cold-pressed to obtain the anode.

Preparation of the Electrolytic Solution

Under a dry argon environment, LiPF$_6$ was added to a solvent formed by mixing propylene carbonate (PC), ethylene carbonate (EC) and diethyl carbonate (DEC) (the weight ratio was 1:1:1), and then uniformly mixed. The concentration of LiPF$_6$ was 1 mol/L, and then 10 wt % of fluoroethylene carbonate (FEC) was added and mixed uniformly to obtain the electrolytic solution.

Preparation of the Separator

A porous PE polymer thin film was used as the separator.

Preparation of the Lithium Ion Battery

The cathode, the separator and the anode were stacked in order, so that the separator was placed between the cathode and the anode to play the role of isolation, and a battery cell was obtained by winding. The battery cell was placed in an outer package, the electrolytic solution was injected, and the outer package was packaged. The lithium ion battery was obtained through the technological processes of forming, degassing, trimming, and the like.

III. Preparation of the Silicon-Based Anode Active Material

1. The silicon-based anode active materials in Embodiments 1 to 9 and Comparative Examples 1 to 6 were prepared by the following method:
   (1) Carbon nanotubes and a polymer were dispersed at a high speed in water for about 12 hr to obtain a uniformly mixed slurry;
   (2) SiO (Dv50 was 3 μm) was added to the uniformly mixed slurry in step (1), and then was stirred for about 4 hr to obtain a uniformly mixed dispersion liquid;
   (3) Spray drying was performed on the dispersion liquid (the inlet temperature was 200° C., and the outlet temperature was 110° C.) to obtain powder; and
   (4) After being cooled, the powder sample was taken out, crushed, and screened through a 400-mesh sieve to obtain silicon-based particles, which were used as the silicon-based anode active material.
2. The silicon-based anode active materials in Embodiments 10 to 12 and Comparative Example 7 were prepared by the following method:

The preparation methods of the silicon-based anode active material in Embodiments 10 to 12 and Comparative Example 7 were similar to the preparation methods of the silicon-based anode active material in Embodiments 1 to 9 and Comparative Examples 1 to 6. A difference was that in Embodiments 10 to 12 and Comparative Example 7, after spray drying was performed, a sintering step was further included, wherein the sintering conditions were as follows: Under nitrogen protection, the temperature was up to 600° C. at 3° C./min, and was held for 2 hr.

Table 1 shows the types and adding amount of various substances used in the preparation method of the silicon-based anode active material in Embodiments 1 to 12 and Comparative Examples 1 to 7.

TABLE 1

| Serial number | Silicon-containing substrate | Added amount of CNT | Type and added amount of polymer |
|---|---|---|---|
| Embodiment 1 | SiO/100 g | 0.5 g | 3 g polyimide |
| Embodiment 2 | SiO/100 g | 0.5 g | 3 g polyimide |
| Embodiment 3 | SiO/100 g | 0.5 g | 3 g polyimide |
| Embodiment 4 | SiO/100 g | 1 g | 3 g carboxymethylcellulose |
| Embodiment 5 | SiO/100 g | 1 g | 3 g carboxymethylcellulose |
| Embodiment 6 | SiO/100 g | 1 g | 3 g carboxymethylcellulose |
| Embodiment 7 | SiO/100 g | 5 g | 10 g carboxymethylcellulose |
| Embodiment 8 | SiO/100 g | 5 g | 10 g carboxymethylcellulose |
| Embodiment 9 | SiO/100 g | 5 g | 10 g carboxymethylcellulose |
| Embodiment 10 | SiO/100 g | 1 g | 3 g carboxymethylcellulose |
| Embodiment 11 | SiO/100 g | 1 g | 3 g carboxymethylcellulose |
| Embodiment 12 | SiO/100 g | 1 g | 3 g carboxymethylcellulose |
| Comparative Example 1 | SiO/100 g | 0.5 g | 3 g polyimide |
| Comparative Example 2 | SiO/100 g | 1 g | 3 g carboxymethylcellulose |
| Comparative Example 3 | SiO/100 g | 5 g | 10 g carboxymethylcellulose |
| Comparative Example 4 | SiO/100 g | 0.5 g | — |
| Comparative Example 5 | SiO/100 g | 1 g | — |
| Comparative Example 6 | SiO/100 g | 5 g | — |
| Comparative Example 7 | SiO/100 g | 1 g | 3 g carboxymethylcellulose |

"—" represents that this substance is not added in the preparation process.

Table 2 shows the types and contents of the metal elements in the silicon-based anode active material in Embodiments 1 to 12 and Comparative Examples 1 to 7. The above contents were all calculated based on the total weight of the silicon-based anode active material.

TABLE 2

| Serial number | Types and contents of metal elements in silicon-based anode active material |
|---|---|
| Embodiment 1 | Fe: 180 ppm; and Co: 45 ppm |
| Embodiment 2 | Fe: 760 ppm |
| Embodiment 3 | Fe: 1592 ppm |
| Embodiment 4 | Fe: 430 ppm |
| Embodiment 5 | Fe: 920 ppm |
| Embodiment 6 | Fe: 2030 ppm; and Co: 30 ppm |
| Embodiment 7 | Fe: 920 ppm |
| Embodiment 8 | Fe: 1532 ppm |
| Embodiment 9 | Fe: 2240 ppm; and Co: 90 ppm |
| Embodiment 10 | Fe: 520 ppm |
| Embodiment 11 | Fe: 930 ppm |

TABLE 2-continued

| Serial number | Types and contents of metal elements in silicon-based anode active material |
|---|---|
| Embodiment 12 | Fe: 2065 ppm; and Co: 40 ppm |
| Comparative Example 1 | Fe: 2530 ppm |
| Comparative Example 2 | Fe: 2850 ppm; and Co: 40 ppm |
| Comparative Example 3 | Fe: 3018 ppm |
| Comparative Example 4 | Fe: 830 ppm |
| Comparative Example 5 | Fe: 1200 ppm |
| Comparative Example 6 | Fe: 1780 ppm; and Co: 600 ppm |
| Comparative Example 7 | Fe: 2950 ppm |

Table 3 shows relevant performance parameters of the silicon-based anode active material in Embodiments 1 to 12 and Comparative Examples 1 to 7.

TABLE 3

| Serial number | Specific surface area ($m^2/g$) | Thickness of polymer layer/ amorphous carbon layer (nm) | Electronic conductivity of powder ($\mu$S/cm) | First reversible capacity (0.005 V-0.8 V) | First efficiency* | The number of cycles when the capacity is attenuated to 80% | K value | DCR (a value under 10% of SOC at room temperature, m$\Omega$) |
|---|---|---|---|---|---|---|---|---|
| Embodiment 1 | 1.7 | 15 | $2.0 \times 10^7$ | 1490 | 63.4% | 756 | 0.065 | 63 |
| Embodiment 2 | 1.8 | 20 | $2.05 \times 10^7$ | 1486 | 63.2% | 750 | 0.066 | 64 |
| Embodiment 3 | 1.6 | 21 | $2.3 \times 10^7$ | 1478 | 62.8% | 748 | 0.068: | 65 |
| Embodiment 4 | 2.0 | 35 | $6.1 \times 10^7$ | 1511 | 64.3% | 830 | 0.040 | 65 |
| Embodiment 5 | 2.2 | 34 | $5.4 \times 10^7$ | 1492 | 63.49% | 827 | 0.067 | 66 |
| Embodiment 6 | 2.4 | 36 | $6.2 \times 10^7$ | 1481 | 63.02% | 823 | 0.092 | 69 |
| Embodiment 7 | 3.0 | 182 | $5.2 \times 10^8$ | 1439 | 61.2% | 709 | 0.096 | 72 |
| Embodiment 8 | 2.8 | 179 | $4.8 \times 10^8$ | 1429 | 60.8% | 705 | 0.098 | 73 |
| Embodiment 9 | 3.1 | 192 | $5.1 \times 10^8$ | 1425 | 60.6% | 700 | 0.102 | 75 |
| Embodiment 10 | 2.3 | 32 | $7.7 \times 10^7$ | 1508 | 64.1% | 828 | 0.042 | 64 |
| Embodiment 11 | 2.5 | 30 | $7.1 \times 10^7$ | 1502 | 63.9% | 823 | 0.059 | 66 |
| Embodiment 12 | 2.2 | 34 | $7.3 \times 10^7$ | 1496 | 63.6% | 819 | 0.089 | 68 |
| Comparative Example 1 | 1.8 | 16 | $2.1 \times 10^7$ | 1420 | 60.4% | 620 | 0.40 | 134 |
| Comparative Example 2 | 2.3 | 22 | $5.6 \times 10^7$ | 1426 | 60.7% | 686 | 0.35 | 120 |
| Comparative Example 3 | 2.7 | 200 | $5.1 \times 10^8$ | 1415 | 60.2% | 613 | 0.46 | 143 |
| Comparative Example 4 | 2.3 | 2 | $3.1 \times 10^7$ | 1432 | 60.9% | 727 | 0.084 | 95 |
| Comparative Example 5 | 2.5 | 10 | $6.5 \times 10^7$ | 1448 | 61.6% | 801 | 0.077 | 80 |
| Comparative Example 6 | 7.3 | 80 | $9.8 \times 10^8$ | 1413 | 60.1% | 656 | 0.120 | 103 |
| Comparative Example 7 | 2.32 | 60 | $7.4 \times 10^7$ | 1450 | 61.7% | 789 | 0.37 | 122 |

*The first efficiency calculation method was the capacity when a lithium intercalation voltage was cut off to 0.8 V/the capacity when a lithium removal voltage was cut off to 0.005 V.

It can be seen from the test results of Embodiments 1 to 12 and Comparative Examples 1 to 7 that, under the condition that the surface of the silicon-based anode active material has a composite layer of polymer or amorphous carbon and CNTs, when the content of a metal element selected from Fe, Cu, Zn, Ni, Co, or any combination thereof in the silicon-based anode active material was less than about 2500 ppm, the K value and impedance of the lithium ion battery prepared therefrom were significantly lower than those of a lithium ion battery with the content of the above metal element being greater than about 2500 ppm, and the first efficiency and cycle performance were significantly better than those of the lithium ion battery with the content of the above metal element being greater than about 2500 ppm.

Figure 2:
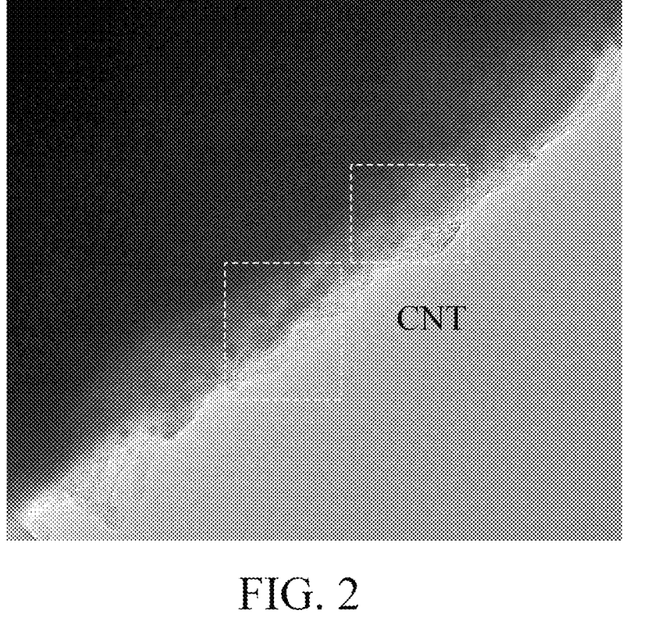
FIG. 2 illustrates a scanning electron microscope (SEM) picture of the surface of a silicon-based anode active material in Embodiment 4 of the present application.
Figure 3:
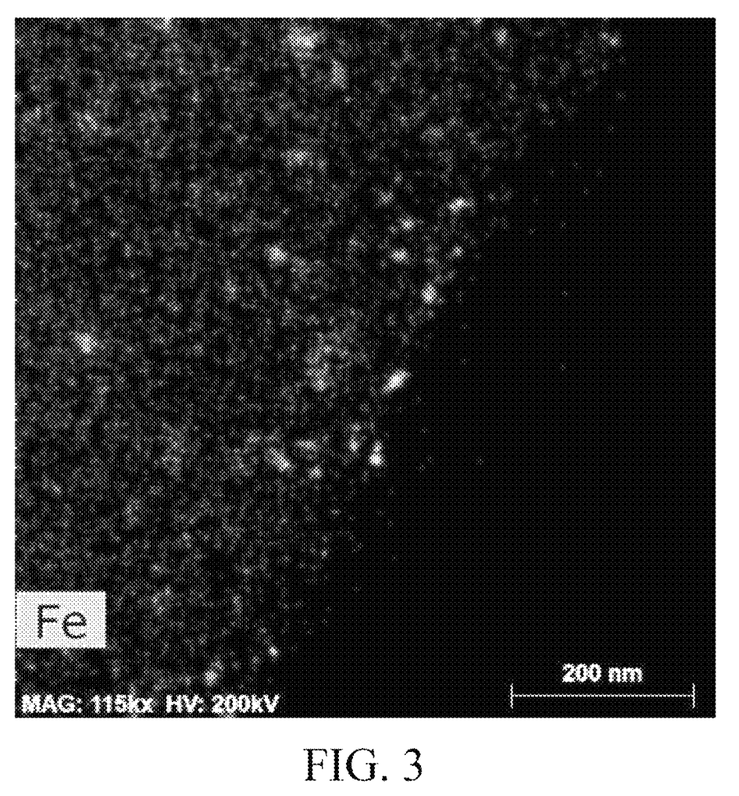
FIG. 3 illustrates a Mapping graph of a Fe element of the silicon-based anode active material in Embodiment 4 of the present application.

FIG. 2 illustrates an SEM picture of the surface of the silicon-based anode active material in Embodiment 4 of the present application. The part within the dotted frame is mainly a polymer layer containing CNTs. FIG. 3 illustrates a Mapping graph of an Fe element of the silicon-based anode active material in Embodiment 4 of the present application.

FIGS. 2 to 3 illustrate a surface appearance of Embodiment 4 and the Mapping graph of the Fe element distributed on the surface.

Throughout the specification, references to "embodiment", "part of embodiments", "one embodiment", "another example", "example", "specific example" or "part of examples" mean that at least one embodiment or example of the present application includes specific features, structures, materials or characteristics described in the embodiment or example. Thus, the descriptions appear throughout the specification, such as "in some embodiments", "in an embodiment", "in one embodiment", "in another example", "in an example", "in a particular example" or "for example", are not necessarily the same embodiment or example in the application. Furthermore, the specific features, structures, materials or characteristics in the descriptions can be combined in any suitable manner in one or more embodiments or examples.

Although the illustrative embodiments have been shown and described, it should be understood by those skilled in the art that the above embodiments cannot be interpreted as limitations to the present application, and the embodiments can be changed, substituted and modified without departing from the spirit, principle and scope of the present application.

What is claimed is:

1. An anode material, comprising: silicon-based particles, wherein the silicon-based particles comprise a silicon-containing substrate; at least a part of the surface of the silicon-containing substrate comprises
   (i) a polymer layer, and
   (ii) an amorphous carbon layer;
   at least one of the polymer layer or the amorphous carbon layer comprises carbon nanotubes;
   the silicon-based particles comprise metal elements; the metal elements comprise Fe, Cu, Zn, Ni, Co, or any combination thereof; and a content of the metal elements is greater than 0 ppm and less than about 2500 ppm based on a total weight of the silicon-based particles.

2. The anode material according to claim 1, wherein the silicon-containing substrate comprises $SiO_x$, and $0.6 \leq x \leq 1.5$.

3. The anode material according to claim 1, wherein the silicon-containing substrate comprises Si, SiO, $SiO_2$, SiC, or any combination thereof.

4. The anode material according to claim 3, wherein a particle size of the Si is less than about 100 nm.

5. The anode material according to claim 1, wherein the polymer layer comprises the following polymer: carboxymethyl cellulose, polyacrylic acid, polyacrylonitrile, polyvinyl alcohol, polyvinylpyrrolidone, polyaniline, polyimide, polyamideimide, polysiloxane, polystyrene-butadiene rubber, epoxy resin, polyester resin, polyurethane resin, polyfluorene, or any combination thereof, and amorphous carbon in the amorphous carbon layer is obtained by sintering the polymer.

6. The anode material according to claim 1, wherein based on the total weight of the silicon-based particles, a content of the polymer layer or the amorphous carbon layer is about 0.05 to 15 wt %.

7. The anode material according to claim 1, wherein based on the total weight of the silicon-based particles, a content of the carbon nanotubes is about 0.01 to 10 wt %.

8. The anode material according to claim 1, wherein based on the total weight of the silicon-based particles, a weight ratio of a polymer in the polymer layer or amorphous carbon in the amorphous carbon layer to the carbon nanotubes is about 1:5-10:1.

9. The anode material according to claim 1, wherein a thickness of the polymer layer or the amorphous carbon layer is about 2 to 200 nm.

10. The anode material according to claim 1, wherein an average particle size of the silicon-based particles is about 500 nm to 30 μm.

11. The anode material according to claim 1, wherein a specific surface area of the silicon-based particles is about 0.5 to 50 $m^2/g$.

12. An anode, comprising an anode material, the anode material comprises silicon-based particles, wherein the silicon-based particles comprise a silicon-containing substrate; at least a part of the surface of the silicon-containing substrate has:
    (i) a polymer layer, and
    (ii) an amorphous carbon layer;
    at least one of the polymer layer or the amorphous carbon layer comprises carbon nanotubes;
    the silicon-based particles comprise metal elements; the metal elements comprise Fe, Cu, Zn, Ni, Co, or any combination thereof; and a content of the metal elements selected from Fe, Cu, Zn, Ni, Co, or any combination thereof is greater than 0 ppm and less than about 2500 ppm based on a total weight of the silicon-based particles.

13. An electrochemical device, comprising the anode according to claim 12.

14. An electronic device, comprising the electrochemical device according to claim 13.

15. The anode material according to claim 1, wherein the content of the metal elements is greater than 0 ppm and less than about 1000 ppm based on the total weight of the silicon-based particles.

16. The anode according to claim 12, wherein the content of the metal elements is greater than 0 ppm and less than about 1000 ppm based on the total weight of the silicon-based particles.

17. The anode material according to claim 1, wherein the content of the metal elements is greater than or equal to 225 ppm and less than about 2500 ppm based on the total weight of the silicon-based particles.

18. The anode according to claim 12, wherein the content of the metal elements is greater than 225 ppm and less than about 2500 ppm based on the total weight of the silicon-based particles.

19. The anode material according to claim 17, wherein the content of the metal elements is greater than or equal to 225 ppm and less than about 1000 ppm based on the total weight of the silicon-based particles.

20. The anode according to claim 18, wherein the content of the metal elements is greater than 225 ppm and less than about 1000 ppm based on the total weight of the silicon-based particles.

* * * * *